United States Patent [19]

Givens

[11] 4,311,912
[45] Jan. 19, 1982

[54] NEUTRON ACCELERATOR TUBE HAVING IMPROVED TARGET SECTION

[75] Inventor: Wyatt W. Givens, Dallas, Tex.

[73] Assignee: Mobil Oil Corporation, New York, N.Y.

[21] Appl. No.: 147,904

[22] Filed: May 8, 1980

[51] Int. Cl.$^3$ .............................................. G21G 4/02
[52] U.S. Cl. .................................... 376/109; 376/117; 376/118
[58] Field of Search ............... 250/499, 500, 501, 502, 250/423 R, 423 F, 427, 399; 313/61 S, 61 R, 359

[56] References Cited

U.S. PATENT DOCUMENTS 3,246,191  4/1966  Frentrop ............................. 250/501
3,393,316  7/1968  Carr .................................... 250/499

Primary Examiner—Bruce C. Anderson
Attorney, Agent, or Firm—George W. Hager; Michael G. Gilman; Charles A. Huggett

[57] ABSTRACT

A neutron accelerator tube having a replenisher section for supplying accelerator gas, in ionization section adjacent the replenisher section adapted to receive the accelerator gas, and a target section adjacent the ionization section. The target section includes a chamber having a tritium target therein. A cathode member is interposed between the ionization section and the target chamber and has a recessed convergent surface exposed to the target chamber. An aperture in the cathode member at the vortex of this recessed surface provides for the extraction of ionized accelerator gas from the ionization section into the target chamber. An extraction electrode is also located in the target chamber between the target and the cathode and has a divergent projecting surface facing the recessed cathode surface. This electrode has an aperture at the apex of the projecting surface through which ionized accelerator gas may may be directed at the target.

7 Claims, 2 Drawing Figures

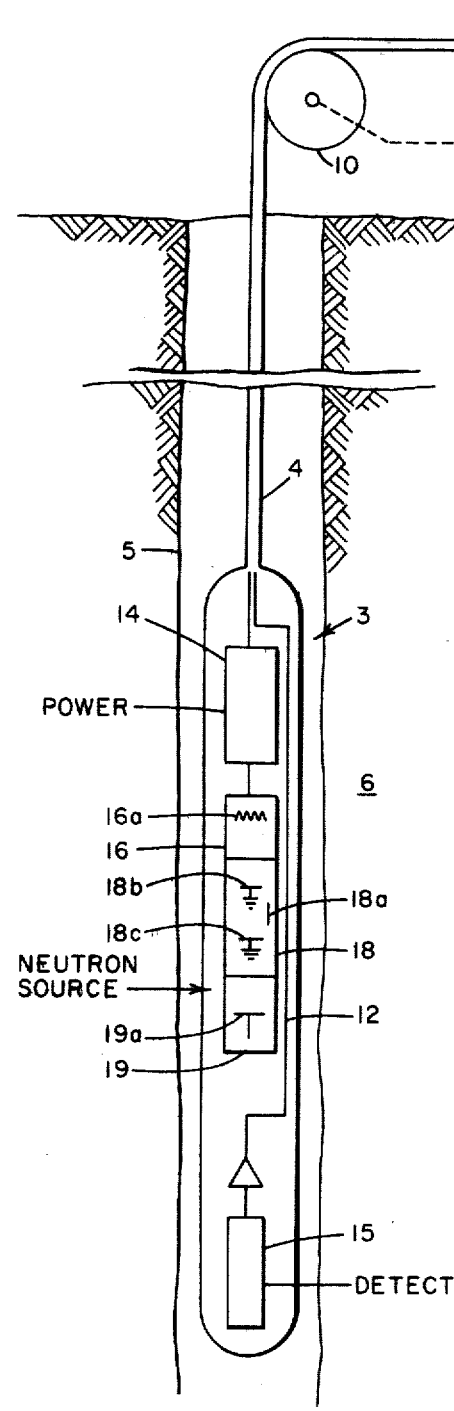
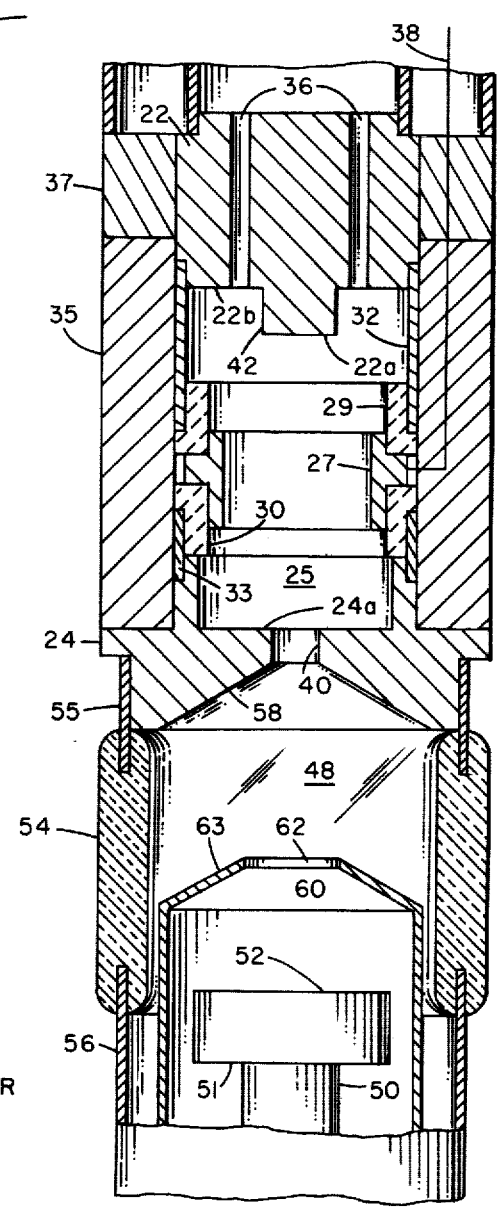
FIG. 1
FIG. 2

NEUTRON ACCELERATOR TUBE HAVING IMPROVED TARGET SECTION

BACKGROUND OF THE INVENTION

This invention relates to neutron sources and more particularly to accelerator-type neutron tube sources having improved target section configurations.

Accelerator-type neutron tube sources are employed in many applications. A well known application is in the radioactivity logging of wells penetrating subterranean formations. For example, in the art of neutron-neutron well logging a source of primary neutrons is employed to irradiate subterranean formations of interest. The resulting secondary radiation is measured by one or more detectors spaced axially from the source within the borehole. Such secondary irradiation may take the form of thermal neutrons, epithermal neutrons, or thermal neutron capture gamma rays. A logging tool of this type employed for porosity measurements is disclosed in U.S. Pat. No. 4,005,290 to Allen wherein the logging tool includes a neutron source and epithermal and thermal neutron detectors.

In procedures such as porosity logging, the neutron source is a continuous source usually of a chemical type. Other well known radioactive well logging techniques involve the use of pulsed neutron sources. For example, in the art of radioactive assay well logging an assay tool is lowered into the well to the level of a formation to be assayed. The assay operation is then carried out by cyclically operating a neutron source in the tool in order to irradiate the formation under investigation with repetitive bursts of fast neutrons. In one assay procedure, disclosed in U.S. Pat. No. 3,686,503 to Givens et al, delayed fission neutrons emitted by uranium within the formation may be detected by a neutron detector. Another procedure, disclosed in U.S. Pat. No. 4,180,730 to Givens et al, involves detection of prompt fission neutrons emitted from uranium in the formation. Pulsed neutron logging techniques may also be employed in procedures in which radioactive decay rates are determined. Thus, the formation under investigation is irradiated with a burst of fast neutrons and the resulting neutron population is detected during successive or overlappping time windows. For example, U.S. Pat. No. 3,800,150 to Givens discloses a pulsed neutron logging technique in which epithermal neutron decay or thermal neutron decay is measured by employing time windows for detection which partially overlap one another.

Neutron sources such as may be employed in radioactive logging procedures as described above may take the form of accelerator-type neutron tubes comprising a target section, a replenisher section, and an ionization section located between the target and the replenisher section. The replenisher section provides a source of accelerator gas to the ionization section where it is ionized and then accelerated to impact the target. The target is formulated of material which responds to the bombarding ions to produce neutrons. In a number of well known accelerator-type tube sources, heavy isotopes of hydrogen are employed as the accelerator gas and in the target. For example, the accelerator gas may take the form of deuterium or mixtures of deuterium and tritium and the target may include tritium molecules, deuterium molecules or mixtures of deuterium and tritium molecules. The so-called deuterium-tritium nuclear reaction is one commonly employed in an accelerator-type neutron tube to produce neutrons. In the replenisher section a fiament or reservoir usually made of zirconium or titanium is electrically heated (under controlled conditions) to release deuterium gas previously adsorbed in the filament or reservoir. Zirconium and titanium have the property of adsorbing copious quantities of different gases such as hydrogen, deuterium, tritium, and other gases. These materials have the further property of releasing the hydrogen isotope gases under a controlled release condition when heated to about 300° C. and at the same time retaining other gases that may have been adsorbed. The deutrium molecules are ionized in the ionizing section by the application of a positive voltage to an anode in the ionizing section. The deuterium ions are then accelerated by a large negative voltage, e.g. $-100$ KV, and impact the tritium target to produce a supply of neutrons.

Various techniques may be employed in ionizing the accelerator gas. One ionization technique employs a radio frequency field to excite the gas and cause ionization thereof. Another procedure, which is suitable particularly where the neutron source is operated at a low accelerator gas pressure and in a pulsed mode, is the so-called Penning method. A Penning ion source comprises spaced cathodes and an anode located intermediate the cathodes. In a cold-cathode type Penning ion source, electrons are emitted from a cathode surface by field emission when a positive voltage pulse is applied to the anode. A magnet associated with the source functions to spiral the electrons thus increasing their flight path and increasing the probability that they will collide with molecules of accelerator gas supplied to the ionization chamber. In a well designed Penning ion source, some of the electrons originating at one cathode surface will impact the other cathode surface and secondary electrons are emitted which also function to increase the ionization reaction. Such ion sources are well known to those skilled in the art and are described in Flinta, J. "Pulsed High-Intensity Ion Source", Part II, Nuclear Instruments 2, pp 219–236 (1958). In a hot-cathode type Penning ion source, one cathode is a heated filament and initial electrons are supplied by thermionic emission from the filament. In all other respects, cold-cathode and hot-cathode Penning ion sources are essentially the same. Hot-cathode ion sources are also well known to those skilled in the art and one such source is described in Wood, J. and Crocker, A. "An Electrostatically Focused Ion Source And Its Use In A Sealed-Off D.C. Neutron Source", Nuclear Instruments And Methods 21, pp 47–48 (1963).

The target section of a neutron accelerator tube conventionally includes, in addition to the target, an extraction electrode interposed between the target and the ionization section. The extraction electrode functions to extract ionized accelerator gas molecules from the ionization section and direct them to the target. The extraction electrode is usually at a somewhat higher negative potential with respect to the target in order to suppress the flow of secondary electrons emitted from the target in the direction of the ionization section.

SUMMARY OF THE INVENTION

In accordance with the present invention, there is provided an accelerator-type neutron tube having a new and improved target section. The neutron tube comprises a replenisher section for supplying accelerator gas, an ionization section adjacent the replenisher section, and a target section adjacent the ionization section. The target section includes a chamber in the tube and a target in the chamber having an active surface facing the ionization section which is formulated of a material which produces neutrons in response to bombardment by ionized accelerator gas. A cathode member interposed between the ionization section and the target chamber has a recessed convergent surface exposed to the target chamber. An aperture in the cathode member at the vortex of this recessed surface provides for the extraction of ionized accelerator gas from the ionization section into the target chamber. An extraction electrode is located in the target chamber at a position interposed between the target and the cathode member. This electrode has a divergent projecting surface facing the recessed surface of the cathode member. The electrode has an aperture at the apex of the projecting electrode surface through which ionized accelerator gas may be directed at the target.

In a preferred embodiment of the invention, the ratio of the diameter of the cathode aperture to its length is greater than 0.75. In yet a further embodiment of the invention, the slope of the projecting surface of the extraction electrode in the direction of the target is at least as great as the slope of the recessed surface of the cathode member in the direction of the target. Preferably, the slope of the electrode surface is greater than the slope of the cathode surface in the direction of the target.

BRIEF DESCRIPTION OF THE DRAWINGS

FIG. 1 is a schematic illustration of a well logging system embodying the present invention, and FIG. 2 is a sectional view of the ionization and target sections of an accelerator-type neutron tube constructed in accordance with the present invention.

DESCRIPTION OF SPECIFIC EMBODIMENTS

Turning now to FIG. 1, the invention will be described with respect to a preferred application in a radioactive well logging system and particularly one in which the neutron source is operated in a pulsed mode. The well logging system comprises a logging tool 3 which is suspended from a cable 4 within a well 5 traversing a subterranean formation of an interest indicated by reference numeral 6. The well bore may be lined or unlined with casing but normally will be filled with a fluid such as drilling mud, oil or water. Signals from the logging tool are transmitted uphole via suitable conductors in the cable 4 to an uphole analysis and control circuit 8. Circuit 8 operates on the downhole measurements and applies one or more output functions to a recorder 9. In addition, circuit 8 transmits certain control functions to the logging tool via conductors in cable 4. As the logging tool is moved through the hole, a depth recording means, such as measuring sheave 10, produces a depth signal which is applied to recorder 9, thus correlating the downhole measurements with the depths at which they are taken.

The logging tool 3 comprises a pulsed neutron source 12, a downhole power supply 14 for the source, and a radiation detector 15, which responds to primary or secondary radiation in the formation in response to the output of the pulsed neutron source. For example, the detector 15 may be a gamma ray detector, a thermal neutron detector or an epithermal neutron detector. While only one detector is shown, it will be recognized that such logging tools may comprise a plurality of detectors responsive to similar or dissimilar radiation.

The pulsed neutron source is an accelerator-type neutron tube comprising a replenisher section 16, an ionization section 18, and a target section 19. Replenisher section 16 may comprise replenisher element 16a which releases deuterium gas in response to an applied DC or AC voltage from power supply 14. Target section 19 comprises a tritium target 19a. The target section also includes an extraction-focusing electrode assembly as describe hereinafter and a negative high voltage supply (not shown) which functions to direct ions from the ionization section 18 to the target 19 while suppressing the counter current flow of secondary electrons produced by ion impact on the target. The ionization section 18 is a Penning-type ion source and includes anode means 18a and cathode means 18b and 18c.

The neutron source 12 may be operated in a continuous or in a pulsed mode. In either mode of operation, deuterium gas released upon the application of power to the replenisher element 16 enters the ionization section 18 where the gas molecules are ionized by a positive (with respect to cathodes 18b and 18c) ionization voltage applied across anode 18 and cathodes 18b and 18c. The deuterium ions formed in the ionization section are then accelerated toward the target 19a by a negative voltage applied to the target section. For example, a positive voltage or voltage pulse with an amplitude from a few hundred volts to a few kilovolts may be applied to anode member 18a and a −100 kilovolt voltage applied to target section 19.

The Penning ionization section of accelerator-type neutron tube may be of the "cold cathode" or of the "hot cathode" type. In the cold cathode source, the primary electrons are produced by field emission when a positive voltage pulse is applied to the anode. In the hot cathode type of source, electrons are initially produced by thermionic emission from an electrically heated filament. The cold cathode source suffers the disadvantage, which is of particular significance when the neutron source is operating in a pulsed mode, of having a time lag before the electron flux reaches a sufficient value for optimum ionization of the accelerator gas. Thus, upon applying a positive voltage pulse to the anode there normally is a period of from about 3–10 microseconds in which the electron flux builds up to an equilibrium value. The hot cathode source does not suffer this disadvantage because electrons are instantly available from thermionic emission. However, the hot cathode source requires an additional high voltage power supply which is particularly significant in the case of downhole logging tools where the power requirements must be met by transmission from the surface.

The concentration of ionized accelerator gas is dependent upon the accelerator gas pressure, i.e., the concentration of gas molecules in the replenisher section and the efficiency of the ionization section. Ionization efficiency is directly related to the flux and energy of free electrons in the ionization section. Therefore, a relatively inefficient ionization process would require a relatively high accelerator gas pressure, i.., a higher concentration of gas molecules. Conversely, the accelerator gas pressure can be significantly reduced by increasing the electron flux in the ionization section. A very significant increase in neutron production is realized by having an ion source that operates efficiently at low gas pressure in the range of a few microns of Hg pressure. This relationship holds true for continuous ion sources as well as for the pulsed ion sources.

The efficiency of the ionization section of the neutron source may be significantly increased by formulating the active surface of one or both of the cathodes with a material having a secondary electron emission factor of 2 or more. Materials which are especially useful in formulating the cathode surfaces including metallic oxides such as aluminum oxide, beryllium oxide, barium oxide, and magnesium oxide. Preferred metal oxides include beryllium oxide, aluminum oxide, and magnesium oxide since these materials are relatively stable in a low pressure environment of hydrogen or its heavy isotopes and, if sufficiently thick, are stable to ion impact. Of the oxides mentioned, beryllium oxide is most resistant to reduction in a hydrogen environment, and thus is especially suitable. Beryllium oxide provides a secondary electron emission factor which is in excess of 3, which is preferred.

The efficiency of the ionization section of the neutron source further may be increased by formulating the active surface of at least one of the cathodes with a radioactive material which functions as a negative beta $(\beta-)$ ray emitter. Radioactive materials which are pure $\beta-$ ray emitters are especially suitable. If desired, both cathodes may be provided with active surfaces formulated of a $\beta-$ ray emitting material. Thus, one or more active cathode surfaces may be formulated of radioactive materials such as nickel-63, promethium-147, and carbon-14. Nickel-63 is particularly useful because it is a pure $\beta-$ emitter and it has a relatively long half-life of nearly 100 years. Nickel-63 can be readily plated onto a support element that is also a good conductor of magnetic flux such as soft iron, alloys of iron, nickel, etc. In an alternative arrangement, the active surface of one of the cathodes is provided with a $\beta-$ ray emitting material whereas the active surface of the other cathode contains a material having a secondary electron emission factor of at least 2 as described above.

In a further configuration of the ionization section which may be employed in conjunction with cathode materials which function as $\beta-$ ray emitters and/or materials of a relatively high secondary electron emission factor as described previously as well as with more conventional cathode materials, one of the cathode members is formed with an active surface having a protuberant portion which extends axially into the chamber of the ionization section. A second cathode member has an aperture therein along the axis of the protuberant portion to provide for the extraction of ions from the ionization chamber. Preferably, the protuberant portion of the cathode surface is in a closer proximity to the ionization section anode than the remainder of the active cathode surface. This configuration of the cathode member functions to increase the electrical field at the peripheral edge of the protuberant portion and through the central interior of the ionization section, thus enhancing field emission of electrons at the peripheral edge, and therefore increasing the probability that the electron emitted from the cathode will travel to the opposing cathode rather than being collected by the anode.

The cathode surface having a protuberant portion may be formulated of a $\beta-$ ray emitting material or a material having a secondary electron emission factor of at least 2. Where the active surface of the first cathode is formulated of a $\beta-$ ray emitting material, the active surface of the second cathode member may be formulated of a material having a secondary electron emission factor of at least 2. In addition, a portion of the active surface of the first cathode member, which is recessed with respect to the protuberant portion, may also be formulated of a material having a secondary electron emission factor of 2 or more. The cathode member interposed between the ionization chamber and the target chamber has an aperture therein to provide for the extraction of the ionized gas particles into the target chamber and ultimately into contact with the target. The side of the cathode member exposed to the target chamber is in the form of a recessed convergent surface with the aperture at the vortex thereof. Thus, the cathode surface may be the nature of a concave surface or the interior of a frustum. The extraction electrode interposed between the target and the cathode has a divergent projecting surface facing the recessed cathode surface. This electrode member has an aperture at the apex of the projecting surface through which the ions are accelerated to bombard the target. Thus, the surface of the extraction electrode as viewed from the cathode may be convex or frusto-conical in shape.

The relationship of the cathode and extraction electrode surfaces are such as to concentrate the electrical field in the target chamber through the central portion thereof, thus enhancing the acceleration and extraction of ions through the cathode aperture to the target. In addition, the ratio of the aperture diameter to its length is not less than 0.75 and preferably is greater than one in order that the electrical field established in the target chamber will penetrate into the ion source and efficiently extract ions from the ionization chamber and furthermore to reduce ion neutralization. Ions contacting the interior surface of the aperture along its length are neutralized by capturing a free electron from the metallic cathode surface, therefore, ion neutralization is reduced by reducing the surface area of probable contact.

Turning now to FIG. 2 of the drawing, there is illustrated a sectional view of the ionization and target sections of the neutron accelerator tube. The ionization section comprises primary and secondary cathode members 22 and 24 which define the upper and lower ends of the chamber 25 in which ionization of the accelerator gas actually takes place. Extending peripherally about the interior of the chamber 25 and located intermediate the cathode members 22 and 24 is an anode member 27. The anode member 27 is mounted on ceramic insulating collars 29 and 30 and thus is insulated from metallic sleeves 32 and 33 which, together with the cathode members, defines the remainer of the ionization chamber. Sleeves 32 and 33 and anode 27 are formed of a nonmagnetic or relatively low permeability metal such as an AISI 300 series austenitic stainless steel. An annular magnet 35 extends around the exterior of the ionization chamber and extends beyond the upper and lower ends of the anode member as shown. Extending from the anode member and between the ceramic collars 29 and 30, and through magnet 35, and an annular ring 37 is an electric lead 38 to a high voltage power supply for the anode. The cathode member 22 is provided with channels 36 through which accelerator gas from the replenisher section 16 flows into the ionization chamber.

Cathode member 24, cathode member 22, and annular ring 37 are all formed of materials which are highly permeable to magnetic flux. For example, these elements may be formed of soft iron or certain stainless steels such as AISI series 410 stainless steel. The upper portion of cathode member 24 and the ring 37 together with the lower portion of cathode member 24 and cathode member 22 thus establish a high permeability flux path which extends initially outwardly from the ends of magnet 35 and then turns inwardly to the active surfaces of the cathode members. The high permeability paths established by cathodes 22 and 24 and ring 37 direct most of the magnetic flux between the north and south poles of magnet 35 into the interior of the chamber 25. In addition, it will be recognized from an examination of FIG. 2 that the strongest electric field established upon the application of a positive voltage to anode member 27 will extend from protuberant portion 42 of cathode member 22. This increases the probability that electrons emitted from cathode members 22 and 24 will impact the opposing cathode surface rather than being collected by anode member 27 and together with the spiraling action imparted by the increased magnetic field within the chamber increases the probability that the electrons will impact accelerator gas molecules to produce the desired ions.

The surfaces of cathode members 22 and 24, which are exposed to the chamber 25, may be formed of any suitable material. Preferably, the surfaces are formed of a beta ray emitting material and/or a material having a high secondary electron emission factor as described previously. Thus, surface 22a on protuberant portion 42 may be formulated of nickel-63 and the recessed portion 22b of the active surface of cathode member 22 formulated of a material such as beryllium oxide. The active surface 24a of cathode member 24 may similarly be formed of beryllium oxide.

The target section includes a target support member 50 and target 51. The face 52 of the target is formulated of a material such as zirconium, titanium or scandium which will absorb or contains sorbed tritium. Target support member 50 extends into the target chamber 48 through a lower bulkhead member (not shown). The target chamber is formed in addition by cathode member 24 and a glass collar 54 which is held in place by a Kovar or other metallic sleeves 55 and 56. Sleeve 55 is welded to cathode member 24 and sleeve 56 is similarly secured to the bottom support member (not shown).

The surface 58 of cathode 24 exposed to the interior of the target chamber converges down to the point at which aperture 40 extends through the cathode member from the ionization chamber to the target chamber. The ratio of the diameter of the aperture 40 to its length (from surface 24a to recessed surface 58) is greater than 0.75 and preferably greater than one in order to provide for efficient extraction of the accelerator gas ions from the ionization chamber and to reduce ion loss by neutralization. In this regard, by making the thickness of the cathode member relatively thin at the location of the aperture the electric field established in the target chamber as described hereinafter tends to extend into the ionization chamber, thus facilitating the extraction of ions and their acceleration toward the target 51.

An extraction electrode 60 is interposed between the target surface 52 and the cathode surface 58. The electrode 60 has an aperture 62 therein and the surface 63 facing the cathode surface 58 is projected toward the cathode surface and diverges away from aperture 62. An illustrated in FIG. 2, the electrode surface 63 is of the same general configuration as the cathode surface 58 and is generally parallel therewith. Thus, the slopes of the surfaces 58 and 63 in the direction of the target are substantially the same. The cathode and electrode surfaces tend to concentrate the electric field between the electrode and the cathode along the axis of apertures 40 and 62. A relatively strong field extends from the edge of aperture 40 to the edge of aperture 62. In addition, the field extends into aperture 40 somewhat thus increasing the probability that ions produced in chamber 25 will be extracted and accelerated toward the target surface 52. By shaping the electrode surface 63 so that its slope toward the target is at least as great as the slope of surface 58, the field strength in the peripheral regions of chamber 48 can be maintained at an acceptable level without internal arcing associated with field emission breakdown. In a further embodiment of the invention, the extraction electrode member 60 is shaped such that the slope of surface 63 toward the target is greater than that of surface 58. Thus, in the peripheral regions of the chamber the distance between a point on surface 58 and the corresponding point on surface 63 is greater than the distance between the corresponding surfaces in the central portion of the chamber. This further weakens the electric field in the peripheral portion of the chamber relative to the field through the central portion thereof and, again, reduces the probability of internal arcing and increases the probability that the accelerated ions will impact the target.

As noted previously, the diameter of the aperture through the cathode member 24 preferably is greater than the length thereof. Preferably, the wall of electrode 60 is relatively thin so that this same relationship holds for aperture 62. In fact, it is preferred that the diameter of aperture 62 be at least 2 times greater than the length thereof. This relationship substantially lessens the probability that ions accelerated through the target chamber 48 will impact the electrode, thus increasing the bombardment rate on the target. It is further preferred that the diameter of aperture 62 be greater than aperture 40. This relationship provides for ion optics in the target chamber such that the target can be placed in relatively close proximity to the extraction electrode.

As noted previously, the extraction electrode 60 is maintained at a slightly lower negative potential than target 52 during production of the neutron burst. For example, the target may be maintained at a potential of $-95$ KV and the electrode at a potential of $-100$ KV. The cathode 24 is, of course, positive with respect to the target and extraction electrode and negative with respect to the anode 27. Thus, the cathode 24 may be at chassis ground and the anode during the time that neutrons are produced at a positive voltage of from several hundred to perhaps 3 KV. The negative voltages may be applied to the extraction electrode and target by any suitable means. One suitable technique is to connect the target and extraction electrode in parallel to the same negative voltage source with the resistance in the target circuit being greater than the resistance in the electrode circuit. Thus, when the tube is quiescent the target and electrode are the same negative voltage. However, as accelerator gas ions are produced the resulting current flow through the resistance in the target circuit reduces the voltage at the target by an appropriate amount.

I claim:

1. In a neutron accelerator tube having a replenisher section for supplying accelerator gas, an ionization section adjacent said replenisher section, and a target section adjacent said ionization section comprising:

(a) means forming a target chamber in said tube, (b) a target in said chamber having an active surface facing said ionization section formulated of a material which produces neutrons in response to bombardment by ionized accelerator gas, (c) a cathode member interposed between ionization section and said target chamber, said cathode member having a recessed convergent surface exposed to said target chamber which converges down to a point at which an aperture in said cathode member extends from said target chamber to said ionization section to provide for the flow of ionized gas from said ionization section into said target chamber, said cathode thereby giving a concave-like appearance when viewed from said target chamber, and (d) an extraction electrode in said target chamber interposed between said target and said cathode member and having a divergent projecting surface facing said recessed cathode surface which projects outward to a point at which an aperture therein extends from said target chamber toward said target, said electrode thereby giving a convex-like appearance when viewed from said cathode, whereby the relationship between said cathode member and said extraction electrode surfaces concentrates the electric field in said target chamber through the central portion thereof so as to enhance the acceleration and extraction of ions through said cathode aperture to said target, and whereby the field strength in the peripheral regions of said target chamber is maintained at an acceptable level without internal arcing associated with field emission breakdown.

2. The system of claim 1 wherein the ratio of the diameter of said cathode aperture to the length thereof is at least 0.75.

3. The system of claim 1 wherein the diameter of the aperture in said electrode is greater than the diameter of the aperture in said cathode.

4. The system of claim 1 wherein the diameter of the aperture in said electrode is greater than the length thereof.

5. The system of claim 1 wherein the slope of the projecting surface of said electrode in the direction of said target is at least as great as the slope of the recessed surface cathode in the direction of said target.

6. The system of claim 5 wherein the slope of said electrode surface in the direction of said target is greater than the slope of said cathode surface in the direction of said target.

7. The system of claim 6 wherein the diameter of said electrode aperture is greater than the diameter of said cathode aperture.

* * * * *